(12) United States Patent
Vanhille et al.

(10) Patent No.: US 7,246,965 B2
(45) Date of Patent: Jul. 24, 2007

(54) METHOD OF ASSEMBLING A LINK TO A SUPPORT, AND A VIBRATION-DAMPING DEVICE MANUFACTURED BY SAID METHOD

(75) Inventors: Patrick Vanhille, Beaugency (FR); Laurent Bodin, Chevilly (FR)

(73) Assignee: Hutchinson, Paris (FR)

( * ) Notice: Subject to any disclaimer, the term of this patent is extended or adjusted under 35 U.S.C. 154(b) by 15 days.

(21) Appl. No.: 10/799,210

(22) Filed: Mar. 12, 2004

(65) Prior Publication Data

US 2004/0265048 A1   Dec. 30, 2004

(30) Foreign Application Priority Data

Mar. 14, 2003  (FR) ................................. 03 03176

(51) Int. Cl.
*F16C 11/06* (2006.01)
*F16D 1/12* (2006.01)
*F16J 1/16* (2006.01)

(52) U.S. Cl. ...................... 403/157; 403/162; 403/280; 403/281; 403/282; 411/452

(58) Field of Classification Search ........ 403/150–152, 403/157–159, 154, 62, 161–162, 274, 277, 403/280–282, 359.1; 411/452, 451, 451.5
See application file for complete search history.

(56) References Cited

U.S. PATENT DOCUMENTS

| | | | | |
|---|---|---|---|---|
| 2,706,769 A | * | 4/1955 | Cook | 362/578 |
| 3,108,500 A | * | 10/1963 | Merriman | 408/241 R |
| 4,097,168 A | * | 6/1978 | Pagel | 403/388 |
| 4,188,146 A | * | 2/1980 | Stecklein | 403/158 |
| 4,335,873 A | * | 6/1982 | Kiefer | 269/228 |
| RE31,298 E | * | 7/1983 | Herbenar | 403/158 X |
| 4,509,381 A | * | 4/1985 | Ikemoto et al. | 74/413 |
| 4,766,980 A | * | 8/1988 | Engle | 403/157 X |
| 4,960,341 A | * | 10/1990 | Aarre et al. | 403/24 |
| 5,064,726 A | | 11/1991 | Swars | |
| 5,458,647 A | * | 10/1995 | Brochier et al. | 403/157 X |
| 5,664,327 A | | 9/1997 | Swars | |
| 5,807,007 A | * | 9/1998 | Stemper | 403/13 |
| 6,071,032 A | * | 6/2000 | Link | 403/158 |
| 6,176,800 B1 | * | 1/2001 | Shaffer et al. | 475/88 |
| 6,340,263 B1 | * | 1/2002 | Fleischer | 403/151 |
| 6,607,203 B2 | * | 8/2003 | Bodin | 280/93.512 |

FOREIGN PATENT DOCUMENTS

| | | |
|---|---|---|
| DE | EP 0 621 410 A2 | 10/1989 |
| FR | EP 0 647 787 A1 | 10/1994 |
| FR | EP 0 691 481 A1 | 7/1995 |

\* cited by examiner

*Primary Examiner*—Daniel P. Stodola
*Assistant Examiner*—Nahid Amiri
(74) *Attorney, Agent, or Firm*—McDonnell Boehnen Hulbert & Berghoff LLP

(57) ABSTRACT

A method of assembling a link to a support, the link comprising a body that is elongated along a longitudinal axis between a first sleeve and a second sleeve that are part of the body, the first sleeve surrounding an inner strength member mounted to move relative to the body of the link about an axis of rotation, by a flexible coupling interposed between the strength member and the first sleeve, a passageway passing through the inner strength member substantially along the axis of rotation and the support having a fixing tab provided with a fixing orifice, the method including a fixing step in which the fixing shank is engaged by force along the axis of rotation into the fixing orifice and into the passageway.

5 Claims, 1 Drawing Sheet

METHOD OF ASSEMBLING A LINK TO A SUPPORT, AND A VIBRATION-DAMPING DEVICE MANUFACTURED BY SAID METHOD

The present invention relates to methods for assembling a link to a support and to vibration-damping devices comprising a link and a support assembled using said method.

More particularly, the invention relates to a method of assembling a link to a support. In this type of method, the link comprises a body that is elongated along a longitudinal axis between a first sleeve and a second sleeve that are part of the body. In said link, at least the first sleeve surrounds an inner strength member. Said inner strength member is mounted to move relative to the body of the link, about an axis of rotation, by means of a flexible coupling interposed between said strength member and the first sleeve. A passageway passes through the inner strength member substantially along the axis of rotation. The support has at least one fixing tab provided with a fixing orifice.

BACKGROUND OF THE INVENTION

Methods whereby such a link is assembled to such a support are known in which the link and the support are positioned so that the passageway passing through the inner strength member faces the fixing orifice, and the link is assembled to the support by passing a bolt both through the orifice and through the passageway, and by clamping the resulting assembly with a nut that co-operates with the bolt.

The tightening operation, in mass-production assembly methods, is performed by a screw-driving machine. Unfortunately, the torque of a screw-driving machine is difficult to control.

OBJECTS AND SUMMARY OF THE INVENTION

A particular object of the present invention is to provide a method of assembling a link to a support that makes it possible, in particular, to overcome the above-mentioned drawback of nut-and-bolt assembly methods.

To this end, the invention provides a method of assembling a link to a support, wherein, in addition to the above-mentioned characteristics, a fixing shank is engaged by force along the axis of rotation into the fixing orifice, and into at least a portion of the passageway so as to hold the connection on the support and so as to prevent the inner strength member from rotating relative to the support.

By means of these provisions, when the fixing shank is engaged by force into the fixing orifice and into at least a portion of the passageway, the material of the support and the material of the inner strength member are deformed. Said material deforming makes it possible, with a fixing shank adapted for this purpose, to hold the link on the support and to prevent the inner strength member from rotating relative to said support. This method advantageously replaces nut-and-bolt assembly methods. It is then no longer necessary to use a screw-driving machine.

In addition, the method of the invention is particularly economical because of the time that can be saved by implementing it, compared with implementing an assembly method involving screw-tightening.

In exemplary implementations of the invention, recourse may optionally also be made to one or the other of the following provisions:

the support has two fixing tabs, each of which is provided with a respective fixing orifice, the link and the support are positioned so that the passageway passing through the inner strength member extends between the two fixing orifices, and a fixing shank is engaged by force so that it passes both through the passageway and also through each of the fixing orifices; and the support has two fixing tabs, each of which is provided with a respective fixing orifice, the link and the support are positioned so that the passageway passing through the inner strength member extends between the two fixing orifices, and two fixing shanks are engaged by force so that each of them is engaged both in at least a portion of the passageway and also in a respective one of the fixing orifices; by means of the method of the invention it is thus possible to obtain a symmetrical device making it possible to overcome the assembly problems.

In another aspect, the invention provides a vibration-damping device comprising a link and a support;

the link comprises a body that is elongated along a longitudinal axis between a first sleeve and a second sleeve that are part of the body, in which link at least the first sleeve surrounds an inner strength member, said inner strength member being mounted to move relative to the body of the link, about an axis of rotation, by means of a flexible coupling interposed between said strength member and the first sleeve, and a passageway passing through the inner strength member substantially along the axis of rotation; and the support has at least one fixing tab provided with a fixing orifice, and the link and the support are assembled together so that the passageway passing through the inner strength member faces the fixing orifice, and at least one fixing shank extending along the axis of rotation in the fixing orifice and in at least a portion of the passageway so as to hold the connection on the support and so as to prevent the inner strength member from rotating relative to the support.

In exemplary embodiments of the invention, it is optionally possible also to use any one of the following provisions:

the support has two fixing tabs, each of which is provided with a respective fixing orifice, the passageway passing through the inner strength member extending between the two fixing orifices, and each of two fixing shanks being engaged both in at least a portion of the passageway and also in a respective one of the fixing orifices;

each fixing rod has an outside surface over which fluting is distributed that extends longitudinally parallel to the axis of rotation; in which case, the fluting increases the area of contact between the inner strength member and the fixing shank, and between said fixing shank and the fixing tab; the material of the fixing tab and the material of the inner strength member deforming while the fixing shank is being engaged by force makes it possible to hold the link on its support very effectively; it also enables the torque that can be exerted between the link and its support, without the inner strength member turning relative to the support, to be increased, relative to the torque that can be exerted with a nut-and-bolt assembly method;

each fixing shank is provided with a head being stopped by a fixing tab on that side of the fixing tab which is opposite from its side that co-operates with the inner strength member; and each fixing rod is made of steel of class 10.9.

BRIEF DESCRIPTION OF THE DRAWINGS

Other aspects, objects, and advantages of the invention appear on reading the description of an embodiment thereof.

The invention is also better understood by means of the drawings, in which.

MORE DETAILED DESCRIPTION

In the various figures, like references designate elements that are identical or similar.

Figure 1:
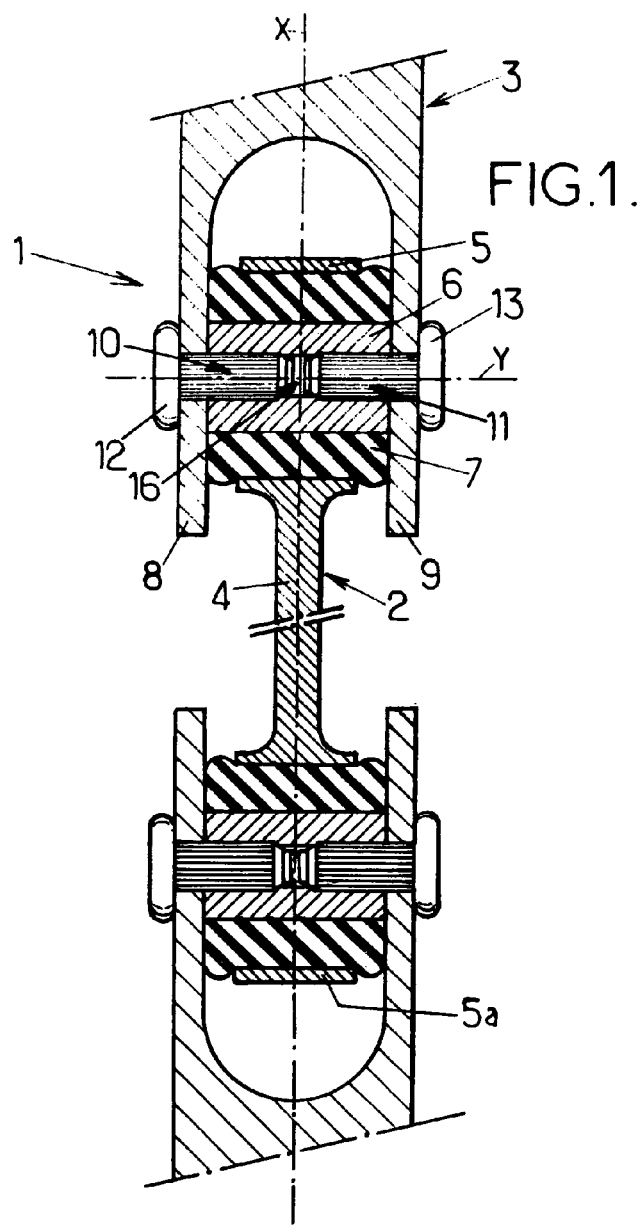
FIG. 1 is a diagrammatic fragmentary section view of a support and a link in an example of a vibration-damping device of the present invention.

In one embodiment of the vibration-damping device of the present invention, shown in FIG. 1, the device 1 comprises a link 2 and a support 3.

The link 2 comprises an elongated body 4 which extends along a longitudinal axis X, and which interconnects a first sleeve 5 and a second sleeve 5a.

For simplification reasons, only the first sleeve 5 is described in detail below. The structure of the link 2, at the second sleeve, can easily be deduced by the person skilled in the art from the following description of the link 2 at the first sleeve 5.

The first sleeve 5 is centered on an axis of rotation Y and surrounds an internal strength member 6.

The first sleeve 5, which is formed integrally with the body 4, and the inner strength member 6 are made of a ductile material such as aluminum.

The inner strength member 6 is connected to the first sleeve 5 via a flexible coupling 7. For example, the flexible coupling 7 is in the form of a body made of elastomer that is bonded to and is overmolded on the inner strength member 6 and the first sleeve 5.

The inner strength member 6 is in the form of a cylindrical tube that is circularly symmetrical about the axis of rotation Y. The inside of said tube defines a passageway 16 which extends along the axis of rotation Y so as to pass through the inner strength member 6.

The support 3 is provided with two fixing tabs 8 and 9. Each fixing tab 8 or 9 is provided with a through orifice 10 or 11. The orifices 10 and 11 are cylindrical and centered on an axis perpendicular to the axes along which the fixing tabs 8 and 9 extend.

When the link 2 is assembled to the support 3, the axes along which the fixing tabs 8 and 9 extend are substantially parallel to the longitudinal axis X of the link 2, and the axis between the orifices 10 and 11 substantially coincides with the axis of rotation Y. The inner strength member 6 extends along the axis of rotation Y between the two fixing tabs 8 and 9.

The link 2 is held on the support 3 by means of studs 12 and 13.

Figure 2:
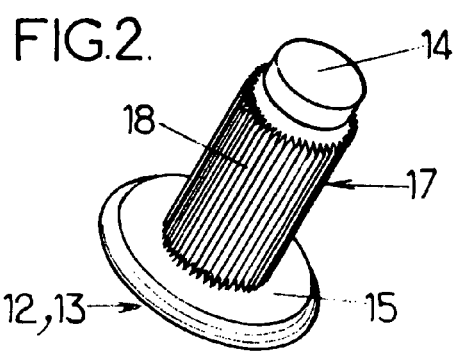
FIG. 2 is a diagrammatic perspective view of a stud as used to assemble together the link and the support of the vibration-damping device shown in FIG. 1.

As shown in FIG. 2, each stud 12 or 13 comprises a fixing shank 14 and a head 15. Each stud 12 or 13 is made of steel of class 10.9.

The studs 12 and 13 are engaged by force, with their tails facing each other, through the orifices 10 and 11 and substantially over respective halves of the length of the passageway 16. Each fixing shank 14 then extends substantially parallel to the axis of rotation Y (see FIG. 1).

Each fixing shank 14 has an outside surface 17 over which fluting 18 is distributed. The fluting 18 extends parallel to the longitudinal axis of the fixing shank 14. When the studs 12 and 13 are in place for assembling together the support 3 and the link 2, the head 15 is stopped by the corresponding fixing tab 8 or 9 (see FIG. 1).

By way of example, for a fixing shank 14 that is 12 mm in diameter, the fluting 18 can correspond to a knurling tool that is 13.1 mm in diameter, with a pitch of 1.3 in compliance with DIN 82 Standards.

The heads 15 are relatively flat (for example, their thickness is substantially equal to 5 mm). The vibration-damping device of the invention is thus compact. This offers the advantage of reducing the problems of positioning the vibration-damping device of the invention in its environment.

The assembly method of the invention makes it possible to adapt to the dimensions, to the shapes, and to the deformations of the fixing tabs 8 and 9 and of the inner strength member 6.

What is claimed is:

1. A vibration-damping device comprising a link and a support;

the link comprising a body that is elongated along a longitudinal axis between a first sleeve and a second sleeve that are part of the body, in which said link at least the first sleeve surrounds an inner strength member, said inner strength member is being mounted to move relative to the body of the link, about an axis of rotation, by a flexible coupling interposed between said strength member and the first sleeve, a passageway passing through the inner strength member substantially along the axis of rotation; and the support having at least one fixing tab provided with a fixing orifice, in which device the link and the support are positioned so that the passageway passing through the inner strength member faces the fixing orifice;

wherein the link and the support are assembled together by at least one fixing shank extending along the axis of rotation and force fitted in the fixing orifice, each fixing shank has an outside surface over which fluting is distributed that extends longitudinally parallel to the axis of rotation and in at least a portion of the passageway so as to hold the link on the support and so as to prevent the inner strength member from rotating relative to the support.

2. A vibration-damping device according to claim 1, in which the at least one fixing shank is two fixing shanks and the support has:

two fixing tabs, each of which is provided with a respective fixing orifice, the passageway passing through the inner strength member extending between the two fixing orifices, and each of the two fixing shanks being engaged both in at least a portion of the passageway and also in a respective one of the fixing orifices.

3. A vibration-damping device according to claim 1, in which each fixing shank is provided with a head being stopped by a fixing tab on that side of the fixing tab which is opposite from its side that co-operates with the inner strength member.

4. A vibration-damping device according to claim 1, in which each fixing shank is made of steel.

5. An apparatus comprising:

a link comprising (i) a first sleeve;

(ii) a second sleeve;

(iii) a body elongated along a longitudinal axis, the body interconnecting the first sleeve and the second sleeve;
(iv) an inner strength member surrounded by the first sleeve, wherein the inner strength member defines a passageway substantially along an axis of rotation of the inner strength member; and
(v) a flexible coupling interposed between the inner strength member and the first sleeve, wherein the inner strength member is rotatable about the axis of rotation relative to the body of the link;

a support comprising:
(vi) at least one fixing tab; and
(vii) a fixing orifice, wherein the link and the support are arranged such that the passageway of the inner strength member faces the fixing orifice; and at least one fixing shank force fitted in the fixing orifice and in at least a portion of the passageway of the inner strength member, each fixing shank has an outside surface over which fluting is distributed that extends longitudinally parallel to the axis of rotation, wherein the fixing shank is configured to prevent the inner strength member from rotating relative to the support.

* * * * *